US00RE40628E

(19) United States
(12) Reissued Patent
Chen et al.

(10) Patent Number: US RE40,628 E
(45) Date of Reissued Patent: Jan. 27, 2009

(54) APPARATUS FOR REDUCING EXPOSING TIME OF AN IMAGE PROCESSING SYSTEM

(76) Inventors: Shih-Huang Chen, No. 12, lane 206, Sinjhuang St., Hsin chu County 312 (TW); Shih-Zheng Kuo, No. 21,Alley 8, Lane 57, Yuxi St., Yonghe City, Taipei County 234 (TW)

(21) Appl. No.: 11/490,506

(22) Filed: Jul. 19, 2006

Related U.S. Patent Documents

Reissue of:
(64) Patent No.: 6,765,615
Issued: Jul. 20, 2004
Appl. No.: 09/440,472
Filed: Nov. 15, 1999

(51) Int. Cl.

| | |
|---|---|
| ***H04N 3/14*** | (2006.01) |
| ***H04N 5/335*** | (2006.01) |
| ***H04N 5/225*** | (2006.01) |
| ***H04N 5/232*** | (2006.01) |
| ***H04N 1/04*** | (2006.01) |
| ***G03B 13/00*** | (2006.01) |

(52) U.S. Cl. ..... 348/312; 348/324; 348/340; 348/345; 348/E3.018; 348/E3.019; 358/483

(58) Field of Classification Search ..... 348/221.1, 348/229.1, 230.1, 240.99, 240.3, 311–312, 348/324, 335, 340, 345, 362–368; 235/462.41; 358/482–483

See application file for complete search history.

(56) References Cited

U.S. PATENT DOCUMENTS 5,440,343 A * 8/1995 Parulski et al. ..... 348/316
5,917,620 A * 6/1999 Hasegawa et al. ..... 358/513
6,181,375 B1 * 1/2001 Mitsui et al. ..... 348/240.99
6,249,618 B1 * 6/2001 Hou ..... 382/312
6,441,849 B1 * 8/2002 Fukuda ..... 348/230.1
6,452,634 B1 * 9/2002 Ishigami et al. ..... 348/322
6,570,615 B1 * 5/2003 Decker et al. ..... 348/272
6,580,457 B1 * 6/2003 Armstrong et al. ..... 348/317
6,686,962 B1 * 2/2004 Miyahara ..... 348/311
7,123,292 B1 * 10/2006 Seeger et al. ..... 348/218.1
2002/0145669 A1 * 10/2002 Umeda et al. ..... 348/220.1

* cited by examiner

*Primary Examiner*—Lin Ye
*Assistant Examiner*—Dan Pasiewicz
(74) *Attorney, Agent, or Firm*—Stolowitz Ford Cowger LLP

(57) ABSTRACT

Apparatus for reducing exposing time of an image processing system is disclosed herein. The image processing system including a shift register coupled to a photo-sensing means, the photo-sensing device is used to convert an optical image from a lens to a plurality groups of charge to form an electrical signal. The apparatus includes control device (counter) and a reset gate. The control device generates the first reset signal and the second reset signal depending on whether the image processing system is in a first resolution mode or a second resolution mode. A first number of cells of the photo-sensing device are exposed to the light of the optical image during the first resolution mode, and a second number of cells of the photo-sensing device being exposed to the optical image during the second resolution mode. The first number of cells is greater than the second number of cells. The reset device is used to eliminate the residual charges in the shift register responding to the first reset signal and the second reset signal. The reset device is coupled to the shift register, and throwaway charges generated by the cells of the photo-sensing device, which are not exposed to the light of the optical image.

27 Claims, 5 Drawing Sheets

80h
83
81
79
90
91An
91Ak
91A1
91A2
95hs
96hs2
96hs1
801
99
98
97
105s
105s3
105s2
105s1
time

APPARATUS FOR REDUCING EXPOSING TIME OF AN IMAGE PROCESSING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to apparatus for reducing minimum exposing time of an image-acquiring device of an image processing system, and particularly relates to apparatus for reducing minimum scanning time necessary for a high-resolution-image-acquiring device to scan an object in a low resolution.

2. Description of the Prior Art

An image processing system makes use of focusing a reflected light beam from an object through a photodetector to generate an electrical signal representing the image of the object for further processing, storing and displaying. Among various applications such as image scanners, camera recorders or facsimile machines everywhere in the modern world, in spite of somewhat differences between these machines, there is one necessary primary step. In other words, it is necessary for an image system to acquire an image signal by converting an image of the object to an electrical signal.

Taking an image scanner as example, the block diagram in the prior art is shown in FIG. 1. It is composed of an exposing timing signal source 8, a shift control signal source 9, a light source 10, a glass surface 11, a mirror 12, a lens 13, a photo-sensing device 14, a charge coupled device (CCD) shift register 15, a pre-processing device 16 and a post-processing device 17. The pre-processing device 16 is implemented by electrically coupling a dc-gain voltage amplifier 16a, an analogue-to-digital converter (ADC) 16b. The waveform of the output signal 20, shown in FIG. 2, of an exposing timing signal source 8 is fed to photo-sensing device 14.

This system mentioned above operates in the way that photo-sensing device 14 converts the light emitted by light source 10, a text or a picture firstly reflected by the glass surface 11 and secondly reflected by the mirror 12 to an image signal.

Note that when the front edge of pulse 21 (FIG. 2) is fed to the photo-sensing device 14, the photo-sensing device 14 pour out all the charges to the CCD shift register 15. After the photo-sensing device 14 has poured out all the stored charges, it cumulate the charges produced in the time interval between the back edge of the pulse 21 and front edge of the pulse 23. Subsequently, the photo-sensing device begins to produce and accumulate charge until next front edge arrives. Thus an optical image is transformed into an electrical signal. The electrical signal parallel output to the CCD shift register 15, and is serially fed to the pre-processing device 16.

To precisely describe the operation of photo-sensing device 14 responding to the exposing timing signal source 8, and that of the CCD shift register 15 responding to the shift control signal source 9. The operation of the system is described below. A line of scanned object is exposed to the light source 10, and the photo-sensing device 14 transfers the light from the line on the scanned object into a plurality of groups of charges responding to the pulse 19 and pulse 21 of the output signal 20 of the exposing timing signal source 8. Each cell of the photo-sensing device 14 is exposed to the light from the lens 13 during the exposing time interval between pulse 21 and 23 of the output signal 20 of the exposing timing signal source 8. After the pulse 21 has arrived at the photo-sensing device 14, the plurality groups of charges is fed to the CCD shift register 15 at the same time. In addition, each of the plurality groups of charges generated by each cell of the photo-sensing device 14 is fed to the corresponding potential-energy wells of the CCD shift register 15.

Subsequently, each of the plurality groups of charges stored in each potential-energy wells in the CCD shift register 15 is transmitted to the pre-processing device 16 one after another responding to the output clock pulse 30 of the shift control signal source 9. The plurality groups of charge is stored in each potential-energy well of the CCD shift register 15 before the pulse 23 next to the pulse 21 arrive at the photo-sensing device 14. In addition, each group of charge stored in each potential-energy well of the CCD shift register 15 is subsequently transmitted to the pre-processing device 16. In other words, the group of charge stored in the first potential-energy well a1 of the CCD shift register 15 is transmitted to the pre-processing device 16 responding to the first pulse 31A1 of the clock pulse 30 (shown in FIG. 3).

Then the group of charge stored in the second potential-energy well a2 of the CCD shift register 15 is transmitted to the pre-processing device 16 responding to the second pulse 31A2 of the clock pulse 30 (shown in FIG. 3). Finally the group of charge stored in the n'th potential-energy well an of the CCD shift register 15 is transmitted to the pre-processing device 16 responding to the n'th pulse 31An of the clock pulse 30 (shown in FIG. 3). For the operation mentioned above, it is designed that after the n'th pulse 31An of the clock pulse 30 has been arrived at the CCD shift register 15, the pulse 23 of the pulse 20 arrives at the photo-sensing device 14. So the exposing time of the photo-sensing device 14 is a fixed value, i.e., time interval between pulse 21 and pulse 23, which is a multiplication of pixel rate and pixel number, in spite of the variation of operational mode.

The pixel rate mentioned above is the number of group of charge stored in the potential-energy well of the CCD shift register 15 in a unit time interval. The pixel number mentioned above is the number of the potential-energy well of the CCD shift register 15. In a high resolution mode, more cells of the photo-sensing device 14 are utilized to be exposed to the light source 10. Whereas, in a low resolution mode, less cells of the photo-sensing device 14 are utilized to expose to the light source 10. In addition, the lens seat 18 is moved to a position to fit the scope of projection to the photo-sensing device 14. The position of the lens 13 and the lens seat 18 in the low resolution mode which employing less cells of photo-sensing device 14 is not illustrated in FIG. 1. However the necessary exposing time interval employed in the high resolution mode is the same as that of the low resolution mode. So the user has to wait for a while even the low resolution mode of the image processing system is employed. This is an origin of waste of time for the user.

After the electrical signal has been fed to the pre-processing device 16, the dc-gain voltage amplifier 16a adjusts the dc-gain of the electrical signal and then feed it to the ADC 16b. Contrast adjustment by a Gamma characteristic is performed by the post-processing means 17, and then obtained the output signal which can be further processed or displayed.

In a traditional image-acquiring device of a modern image processing system, it is necessary to provide the user with the high resolution mode and the low resolution mode for various applications. Fewer cells of photo-sensing device 14 are exposed to the light source 10 in the low resolution mode than the high resolution mode. However, the charges in each cell of the photo-sensing device 14 are transmitted through the CCD shift register 15 to the pre-processing device 16 in both high resolution mode and low resolution mode. So the necessary exposing timing interval for the high resolution mode and the low resolution mode is all the same, which is the multiplication of the pixel rate and the pixel number of the photo-sensing device 14. And this is the waste of time for the user when a lower resolution mode of the image processing system is employed. In the traditional image-acquiring device of a modern image processing system, when the frequency of the output signal of the shift control signal source is increased to lower the exposing timing interval. It tends to result the residual charges generated in the previous exposing timing interval in the CCD shift register 15, which affects the charges in the cells of the photo-sensing device 14 in the next exposing timing interval. So the quality of the output image is damaged in the prior art image processing system.

SUMMARY OF THE INVENTION

To reduce the necessary exposing time of the image-acquiring device of the image processing system, the present invention proposes apparatus for converting an optical image through a lens to an electrical signal. The apparatus mention above includes the following devices. The photo-sensing device is used to expose to the light of the optical image responding to an exposing timing signal from an exposing timing signal source. Thus the optical image is converted to a plurality groups of charge.

The shift register is used to parallel receive the plurality groups of charge and serially transmit the plurality groups of charge responding to a shift control signal from a shift control signal source. The serially transmitted plurality groups of charge form the electrical signal. The control device is used to respectively generate a first reset signal and a second reset signal during a first resolution mode and a second resolution mode of the apparatus. The first number of cells of the photo-sensing device is exposed to the light of the optical image during the first resolution mode, and the second number of cells of the photo-sensing device is exposed to light of the optical image during the second resolution mode. The first number of cells of the photo-sensing device is greater than the second number of cells of the photo-sensing device. The period of the first reset signal is proportional to the first number of cells of the photo-sensing device, and the period of the second reset signal is proportional to the second number of cells of the photo-sensing device. In addition, the period of the first reset signal being greater than the second reset signal.

The reset device is used to lead the charges in the shift register to ground responding to the first reset signal and the second reset signal. The reset device coupled to the shift register is used to generate the potential-energy well at the end of each period of the first reset signal and the second reset signal. The potential-energy well accommodates and throwaway residual charges in the CCD shift register. The photo-sensing device converts the optical image to the plurality groups of charge responding to the exposing timing signal. The period of the exposing timing signal is no less than the period of the first reset signal when the image processing system is in the first resolution mode. The period of the exposing timing signal is no less than period of the second reset signal when the image processing system is in the second resolution mode.

Selection device is used to determine whether the apparatus operates in the first resolution mode or in the second resolution mode according to user's selection. The user click on a first position of surface of the selection device to generate a first selection signal, and the user click on a second position of surface of the selection device to generate a second selection signal. The apparatus is operated in the first resolution mode according to the first selection signal, the apparatus being operated in the second resolution mode according to the second selection signal.

Positioning device is used to drive the lens to a first image-capturing position responding to the first selection signal to project the optical image on the first number of cells of the photo-sensing device during the first resolution mode. The positioning device d is used to drive the lens to a first image-capturing position responding to the second selection signal to focus the optical image on the second number of cells of the photo-sensing device during the second resolution mode.

The pre-processing device is used to adjust the dc (direct current) voltage of the electrical signal from the shift register as well as convert the electrical signal from the analog format to the digital format. The post processing device is used to adjust the contrast of the digital electrical signal. The selection device mentioned above can be soft ware or user interface. The positioning device mentioned above can be driving motor, and the pre-processing device can be included in a CCD (Charged Coupled Device).

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

To eliminate the extra scanning time in the low resolution operation mode, the image-acquiring device of the image processing system according to the present invention proposes apparatus for reducing minimum exposing timing interval. In the present invention, fewer cells of photo-sensing device are exposed, and the corresponding number of pulses of the shift control signal are utilized to drive the charges in the potential-energy wells within the CCD shift register in the low resolution operational mode. So the exposing timing interval of the image-acquiring device of the image processing system is reduced according to the present invention.

The image processing system according to the present invention makes use of focusing light beam from an object through a photodetector to generate an electrical signal representing the image of the object for further processing, storing and displaying. Among various applications such as image scanners, camera recorders or facsimile machines everywhere in the modern world, in spite of somewhat differences between these machines, one primary step is necessary. In other words, it is necessary for an image processing system to acquire an image signal by converting an image of the object to an electrical signal, which performed by an image-acquiring device.

Figure 1:
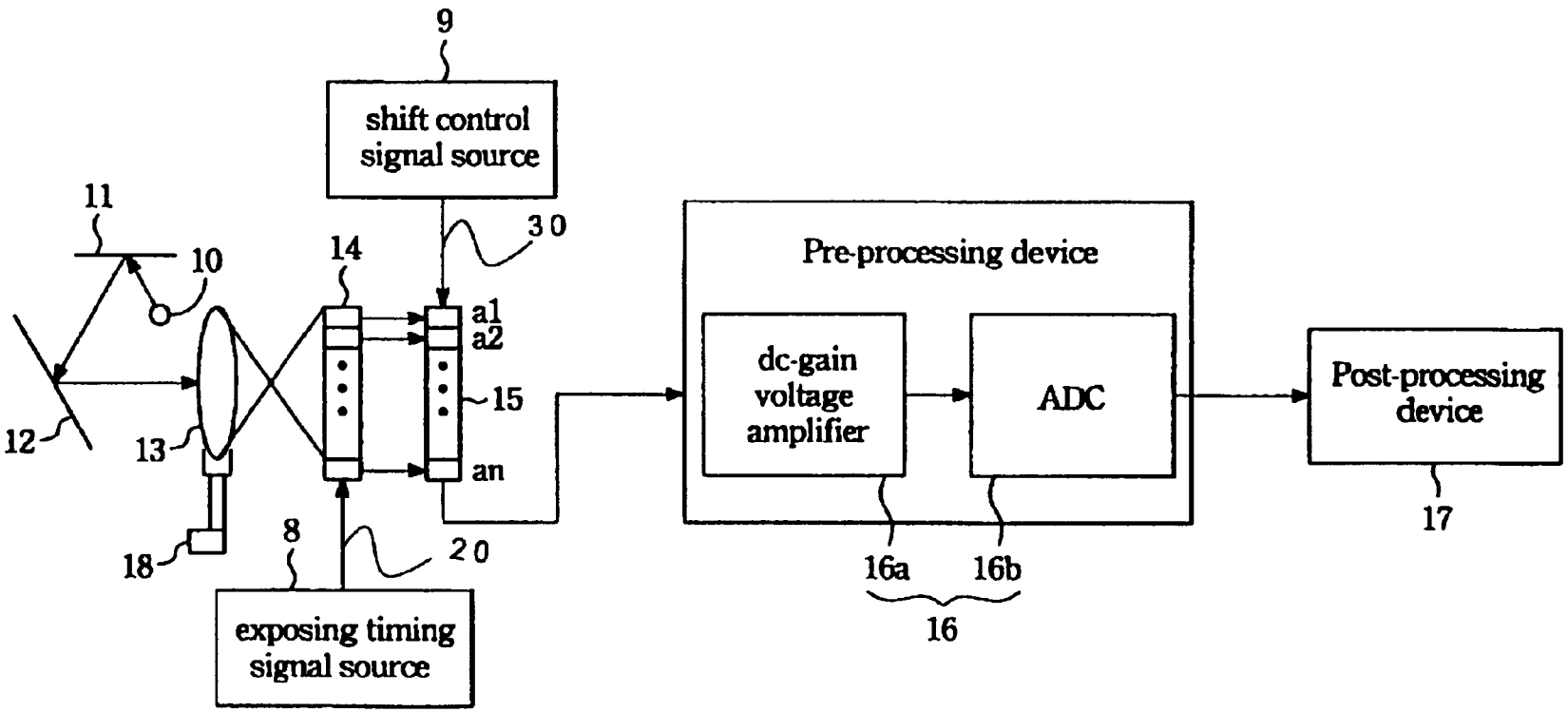
Fig.1 (Prior Art)
FIG. 1 illustrates the schematic diagram of the image processing system in the prior art, which has high resolution mode and low resolution mode.
Figure 2:
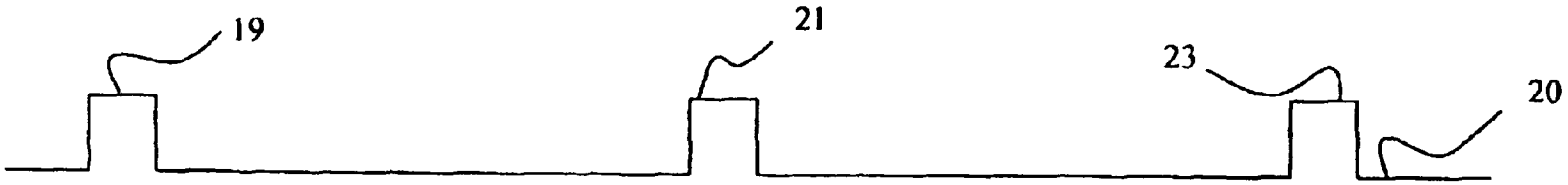
FIG. 2 illustrates the wave form of the exposing timing signal utilized in both high resolution mode and low resolution mode of the prior art image processing system.
Figure 3:
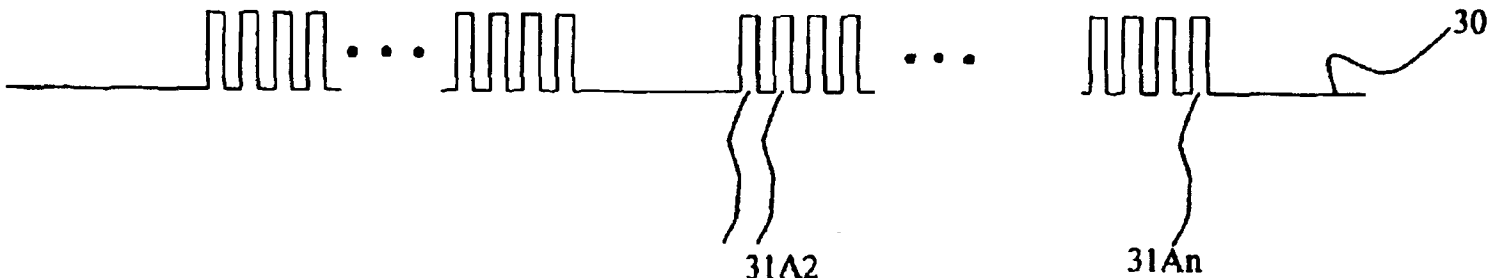
FIG. 3 illustrates the wave form of the shift control signal utilized to drive the charges in the CCD shift register in both high resolution mode and low resolution mode of the prior art image processing system.
Figure 4:
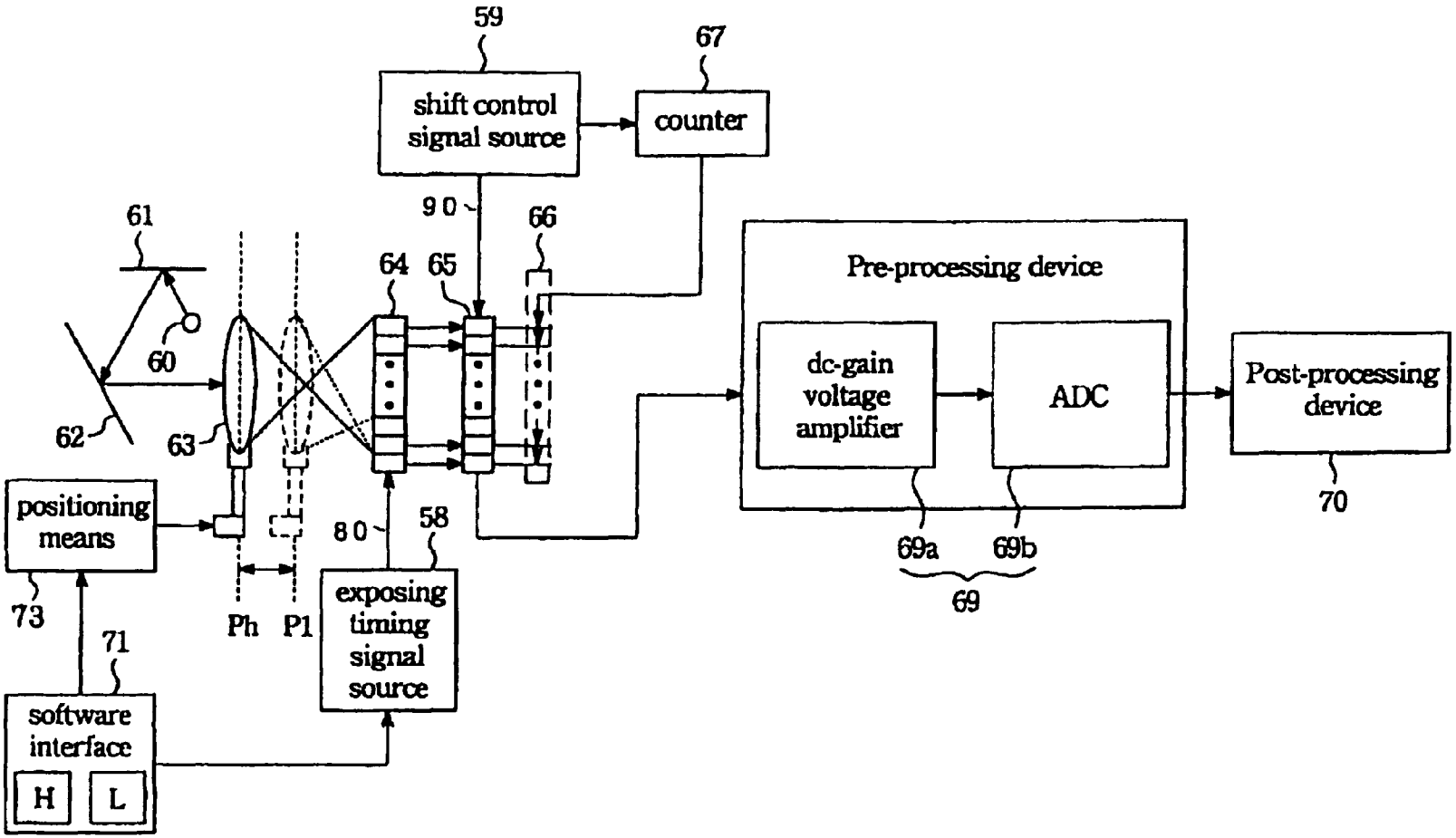
FIG. 4 illustrates the schematic diagram of the image processing system in the preferred embodiment of the present invention, which has high resolution mode and low resolution mode.

Taking an image scanner as an example of the image processing system in the preferred embodiment of the present invention, the block diagram is shown in FIG. 4. It is composed of an exposing timing signal source 58, a shift control signal source 59, a light source 60, a glass surface 61, a mirror 62, a lens 63, a photo-sensing device 64, a charge coupled device (CCD) shift register 65, a reset gate 66, a counter 67, a pre-processing device 69 and a post-processing device 70. The pre-processing device 69 is implemented by electrically coupling a dc-gain voltage amplifier 69a, an analogue-to-digital converter (ADC) 69b. The waveform of the first exposing timing signal 80h or the second exposing timing signal 80l, shown in FIG. 5, of an exposing timing signal source 58 is fed to photo-sensing device 64.

In the image-acquiring device of a modern image processing system, for example, the high resolution mode and the low resolution mode are provided to the user for various applications. The user can use the software interface 71 to select the high resolution mode or the low resolution mode as the operation mode of the image processing system. For example, when the user click on the L bottom of the software interface 71, a selection signal is sent to the positioning means 73, and positioning means 73 drives the lens 63 from position Ph to position Pl. It is designed that the fewer cells of photo-sensing device 64 are exposed to the light source 60 when the lens 63 locates at the position Pl. So fewer cells of photo-sensing device 64 are exposed to the light source 60 in the low resolution mode than the high resolution mode.

When starting acquiring an image in a low resolution mode as described above. The image-acquiring device mentioned above operates in the way that photo-sensing device 64 converts the light emitted by light source 60, a text or a picture firstly reflected by the glass surface 61 and secondly reflected by the mirror 62 to a plurality groups of charges. A portion of the photo-sensing device 64 is exposed to the light refracted by the lens 63 at the position Pl.

Assume a first number of the cell of the photo-sensing device 64 are exposed to the light source 60 in the high resolution mode, and the second number of the cell of the photo-sensing device 64 are exposed to the light source 60 in the low resolution mode. As illustrated in FIG. 4, the second number of the cell of the photo-sensing device 64 exposed to the light source 60 in the low resolution mode is less then the first number of the photo-sensing device 64 in the high resolution mode. Accordingly, the present invention provide the exposing timing signal source 58 that can output the first exposing timing signal 80h (FIG. 5) or the second exposing timing signal 80i (FIG. 6) responding to the selection of the high or low resolution mode in the software interface 71. After the plurality groups of charges has been generated by the photo-sensing device 64, then is transmitted to the corresponding potential-energy wells of the CCD shift register 65 in accordance with the first exposing timing signal 80h or the second exposing timing signal 80i from the exposing timing signal source 58.

Subsequently, responding to the clock pulse 90 from the shift control signal source 59, the plurality groups of charge in the potential-energy wells of the CCD shift register 65 are driven one after another to the pre-processing device 69. Thus the plurality groups of charge form the electrical signal representing one scan line of the scanned image. In other words, one line on the scanned object (text, or picture) is converted to the electrical signal. After the electrical signal has been fed to the pre-processing device 69, the dc-gain voltage amplifier 69a adjusts the dc-gain of the electrical signal and then feed it to the ADC 69b. Contrast adjustment by a Gamma characteristic is performed by the post-processing means 70, and then obtained the output signal representing the image, which can be used to further processed or displayed.

Figures 5, 6, 7, 8, 9:
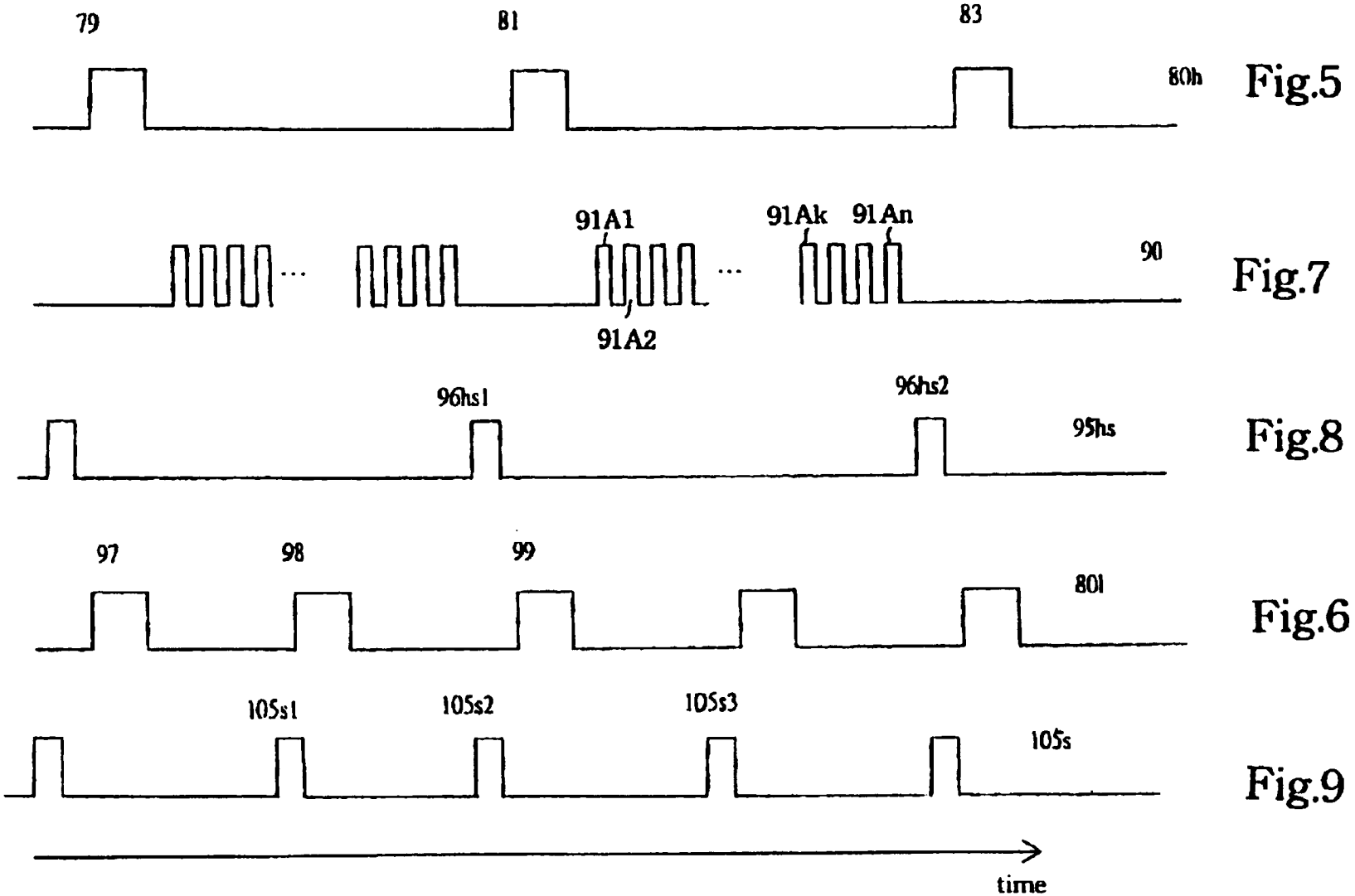
FIG. 5 illustrates the wave form of the exposing timing signal utilized in high resolution mode of the image-acquiring device of the image processing system according to the preferred embodiment of the present invention.
FIG. 6 illustrates the wave form of the exposing timing signal utilized in low resolution mode of the image-acquiring device of the image processing system according to the preferred embodiment of the present invention.
FIG. 7 illustrates the wave form of the shift control signal utilized to drive the charges in the CCD shift register in both high resolution mode and low resolution mode of the of the image-acquiring device of the image processing system according to the preferred embodiment of the present invention.
FIG. 8 illustrates the wave form of the high resolution reset signal utilized in high resolution mode of the image-acquiring device of the image processing system according to the preferred embodiment of the present invention.
FIG. 9 illustrates the wave form of the low resolution reset signal utilized in low resolution mode of the image-acquiring device of the image processing system according to the preferred embodiment of the present invention.

It is noted that, the image-acquiring device of the image processing system according to the present invention can reduce scanning time in the low resolution scanning mode, and the principle is described below. As illustrated in FIG. 4, when the user utilizes the software interface 71 to select the high resolution mode. The plurality groups of charge generated during the high resolution mode exposing timing interval (i.e., the time between the first pulse 79 and the second pulse 81) by the photo-sensing device 64 are driven to the CCD shift register 65 responding to the first pulse 81 (FIG. 5). Then, each of the plurality groups of charge stored in the corresponding potential-energy wells in the CCD shift register 65 are driven to the pre-processing device 69 by each pulse (91A1, 91A2, . . . , 91An) of the clock pulse 90 (FIG. 7). Also, the clock pulse 90 is fed to the counter 67, and the high resolution reset signal 95hs has the period the same as that of the high resolution mode exposing timing interval due to the value transmitted to the counter 67 resulted from the set-up in the software interface 71. For example, assume the photo-sensing device 64 has 10600 cells, thus the number of pulse between the pulse 91A1 and 91An is 10600. So the high resolution mode exposing timing interval is not less than the multiplicity of 10600 and the pixel rate which stands for how much time does it take for the transmission of each group of charge from the CCD shift register 65 to the pre-processing device 69.

It is also noted that the duration between the first reset pulse 96hs1 and the second reset pulse 96hs2 is approximately equal to the high resolution mode exposing timing interval between the first pulse 81 and the second pulse 83 in FIG. 5. Because the second reset pulse 96hs2 of the high resolution reset signal 95hs from the counter 67 arrive at the reset gate 66. All the charges stored in the CCD shift register 65 are transmitted to ground by way of the reset gate 66 which is turned on by the second reset pulse 96hs2 of the high resolution reset signal 95hs. The next line on the scanned object (text, or picture) is subsequently driven by the second pulse 83 to the CCD shift register 65, and is converted to generate the other plurality groups of charge in the next exposing timing interval.

In the other respect, as illustrated in FIG. 4, when the user utilizes the software interface 71 to select the low resolution (operation) mode. The plurality groups of charge generated during the low resolution mode exposing timing interval (i.e., the time between the third pulse 98 and the fourth pulse 99) by the photo-sensing device 64 are driven to the CCD shift register 65 responding to the fourth pulse 98 (FIG. 6). Then, each of the plurality groups of charge stored in the corresponding potential-energy wells in the CCD shift register 65 are driven to the pre-processing device 69 by each pulse (91A1, 91A2, . . . , 91Ak) of the clock pulse 90 (FIG. 7). Also, the clock pulse 90 is fed to the counter 67, and the low resolution reset signal 105s (FIG. 9) has the period about half of that of the high resolution mode exposing timing interval due to the value transmitted to the counter 67 resulted from the set-up relating to the "L" bottom on the software interface 71.

For example, assume the photo-sensing device 64 has 10600 cells, and the low resolution mode be employed to scan the image. Thus the number of pulse between the pulse 90A1 and 90An is 5300. So the low resolution mode exposing timing interval is not less than the multiplicity of 5300 and the pixel rate which stands for how much time does it take for the transmission of each group of charge from the CCD shift register 65 to the pre-processing device 69. It is also noted that the duration between the third reset pulse 105s2 and the fourth reset pulse 105s3 is approximately equal to the low resolution mode exposing timing interval between the third pulse 98 and the third pulse 99 in FIG. 6. Because the fourth reset pulse 105s3 of the low resolution reset signal 105s from the counter 67 arrive at the reset gate 66. All the charges stored in the CCD shift register 65 are transmitted to ground by way of the reset gate 66 which is turned on by the fourth reset pulse 105s3 of the low resolution reset signal 105s.

Figure 10A:
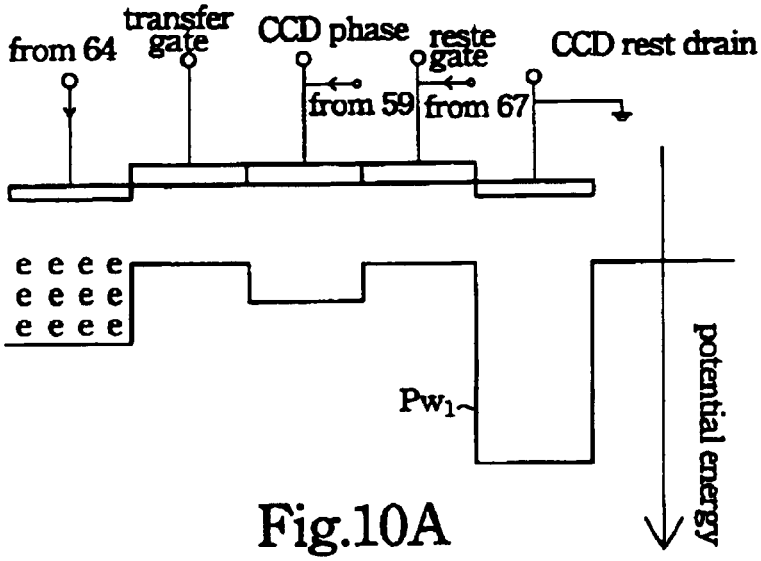
FIG. 10A illustrates the schematic cross-sectional view of a preferred embodiment of the reset gate in the image-acquiring device of the image processing system according to the preferred embodiment of the present invention.
Figure 10B:
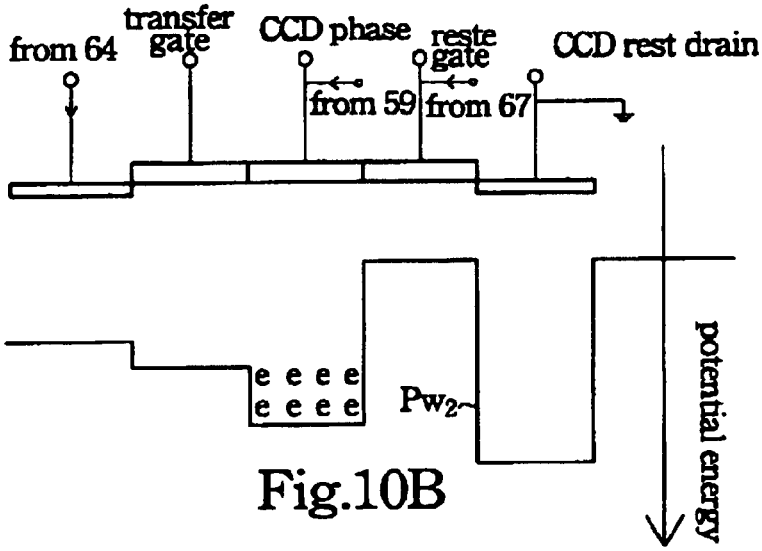
FIG. 10B illustrates the position of the charges and the potential-energy wells induced by individual electrodes of the reset gate in a normal conduction, at this time, the charges are conducted to the CCD shift register.
Figure 10C:
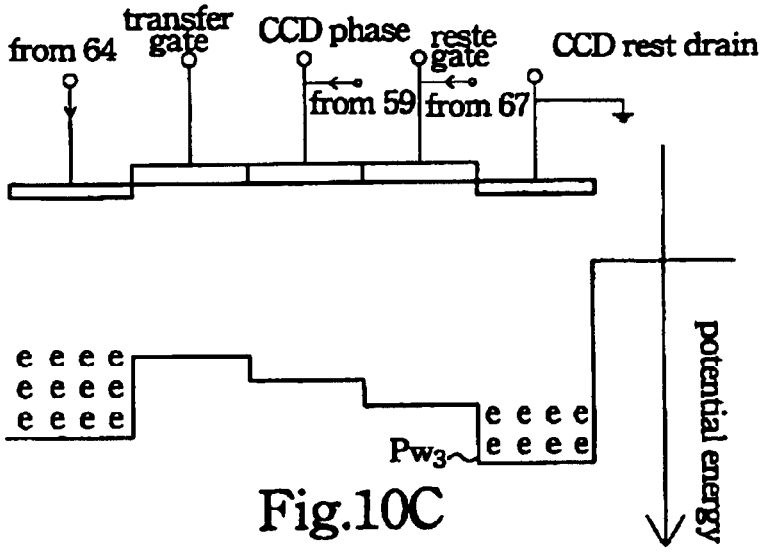
FIG. 10C illustrates the position of the charges and the potential-energy wells induced by individual electrodes of the reset gate, at this time, the charges in the CCD shift register are conducted to ground.

Because the reset gate 66 in the preferred embodiment of the present invention can be implemented by many devices, such as a charge coupled device (CCD). The structure of the reset gate 66 is briefly described in FIG. 10A. In FIG. 10A, the electrode Ereset of the reset gate 66 is coupled to the counter 67 (FIG. 4). At the time when the charges are generated by the photo-sensing device 64 (FIG. 4), and has not been transmitted to the CCD shift register 65, the cross-section of the potential-energy well is illustrated as line PW1, and the charges are still in the photo-sensing device 64. Next, referring to FIG. 10B, the transfer gate and the CCD phase are applied with voltages such that the resulted potential-energy well is as line PW2, and the charges in the photo-sensing device 64 flow to the potential-energy well under the CCD phase electrode.

When the charges in the CCD shift register 65 is to be eliminated, the CCD phase and the reset gate are applied with voltages such that the charges in the potential-energy well under the CCD phase electrode are conducted to the potential-energy well under the CCD reset drain. Then the charges in the potential-energy well under the CCD reset drain are eliminated (such as conducted to ground).

Referring to FIG. 5 and FIG. 6, it is obvious that the necessary exposing time for the low resolution mode is half of that of the high resolution mode. So the image-acquiring device of the image processing system according to the preferred embodiment of the present invention can save the scanning time when operate in low resolution mode. The reset gate and the reset signal utilized to control the reset gate are the elements to reduce the necessary exposing time in low resolution mode, so the scanning time can be reduced in the preferred embodiment of the present invention. In conclusion, there can be many kinds of circuits or structure of the image-acquiring device can perform the function as the present invention. For example, if properly deigned, the counter can be spared, or there can be two lens in the image-acquiring device. The two lens are respectively employed in low resolution mode and high resolution mode. In addition, the position means can be driving motor, and the software interface can be implemented not only in a computer as a application interface, but also can be implemented in the image processing system in the preferred embodiment of the present invention.

In a low resolution mode, fewer cells of photo-sensing device are used to expose to a scan line of the scanned object, so only a number of potential-energy wells of the CCD shift register are used to store the plurality groups of charge during an exposing timing interval. And the present invention is to lead the residual charges in the potential-energy wells of the CCD shift register to ground whenever the plurality groups of charges generated by the fewer cells of the photo-sensing device had been sent to the pre-processing device. So the waste of time in a lower resolution mode is averted in the present invention.

The low resolution mode and high resolution mode in the present invention is just preferred embodiments, there can be several resolution mode can be employed in the present invention, even the user can input the desired resolution. Because the resolution mode is the feature of the present invention, it is only the operational conduction of the present invention, the different resolution modes are not detailed in this specification.

As will be understood by persons skilled in the art, the foregoing preferred embodiment of the present invention is illustrative of the present invention rather than limiting the present invention. Having described the invention in connection with a preferred embodiment, the modification will now suggest itself to those skilled in the art. While the preferred embodiment of the invention has been illustrated and described, it will be appreciated that various changes can be made therein without departing from the spirit and scope of the invention.

What is claimed is:

1. [Apparatus] *An apparatus* for reducing exposing time of an image processing system, said image processing system comprising a shift register coupled to a photo-sensing means, said photo-sensing means being used to convert an optical image from a lens to a plurality *of* groups of charge to form an electrical signal, said apparatus comprising:

control means for generating a first reset signal and a second reset signal during a first resolution mode and a second resolution mode of said image processing system respectively, a first number of cells of said photo-sensing means being exposed to said optical image during said first resolution mode, a second number of cells of said photo-sensing means being exposed to said optical image during said second resolution mode, said first number of cells of said photo-sensing means being greater than said second number of cells of said photo-sensing means, *a* period of said first reset signal being[-] proportional to said first number of cells of said photo-sensing means, *a* period of said second reset signal being proportional to said second number of cells of said photo-sensing [mans] *means*, said plurality *of* groups of charge being transmitted to said shift register, and then being output from said shift register;

*positioning means for driving the lens or the photo-sensing means to a first image-capturing position during the first resolution mode to focus the optical image on the first number of cells of the photo-sensing means during the first resolution mode, the positioning means driving the lens to a second image-capturing position during the second resolution mode to focus the optical image on the second number of cells of the photo-sensing means during the second resolution mode;* and reset means for leading charges in said shift register to ground responding to said first reset signal and said second reset signal[, said reset means coupled to said shift register generating potential-energy well at end of each period of said first reset signal and said second reset signal, said potential-energy well eliminating residual charges left in said shift register, said photo-sensing means converting said optical image to said plurality groups of charge responding to a exposing timing signal, period of said exposing timing signal being no less than period of said first reset signal when said image processing system being in said first resolution mode, period of said exposing timing signal being no less than period of said second reset signal when said image processing system being in said second resolution mode].

2. [Apparatus as] *The apparatus of* claim 1, wherein said image processing system [is] *comprises* an image scanner.

3. [Apparatus as] *The apparatus of* claim 1, wherein said reset means is included in a charge coupled device (CCD).

4. [Apparatus] *An apparatus* for converting an optical image through a lens to an electrical signal, said apparatus comprising:

photo-sensing means for exposing to light of said optical image to convert said optical image to a plurality *of* groups of charge responding to an exposing timing signal from [a] *an* exposing timing signal *means*;

a shift register for parallel receiving said plurality *of* groups of charge and serially transmitting said plurality *of* groups of charge responding to a shift control signal from a shift control signal source, said serially transmitted plurality *of* groups of charges forming said electrical signal;

control means for respectively generating a first reset signal and a second reset signal during a first resolution mode and a second resolution mode of said apparatus, a first number of cells of said photo-sensing means being exposed to light of said optical image during said first resolution mode, a second number of cells of said photo-sensing means being exposed to light of said optical image during said second resolution mode, said first number of cells of said photo-sensing means being greater than said second number of cells of said photo-sensing means, *a* period of said first reset signal being proportional to said first number of cells of said photo-sensing means, *a* period of said second reset signal being proportional to said second number of cells of said photo-sensing means, *the* period of said first reset signal being greater than *the period of* said second reset signal;

*positioning means for driving the lens or the first number of cells to a first image-capturing position during the first resolution mode to focus the optical image on the first number of cells of the photo-sensing means during the first resolution mode, the positioning means for driving the lens or the second number of cells to a second image-capturing position during the second resolution mode to focus the optical image on the second number of cells of the photo-sensing means during the second resolution mode;* and reset means for leading charges in said shift register to ground responding to said first reset signal and said second reset signal[, said reset means coupled to said shift register being used to generating potential-energy well at end of each period of said first reset signal and said second reset signal, said potential-energy well eliminating residual charges left in said shift register, said photo-sensing means converting said optical image to said plurality groups of charge responding to said exposing timing signal, period of said exposing timing signal being no less than period of said first reset signal when said image processing system being in said first resolution mode, period of said exposing timing signal being no less than period of said second reset signal when said image processing system being in said second resolution mode].

5. [Apparatus as] *The apparatus of* claim 4, further comprising:

selection means for determining said apparatus operating in said first resolution mode or in said second resolution mode according to *a* user's selection, *wherein* the user [click on] *chooses* a first position of *a* surface of said selection means to generate a first selection signal, *and wherein* the user [click on] *chooses* a second position of *the* surface of said selection means to generate a second selection signal, said apparatus being operated in said first resolution mode according to said first selection signal, said apparatus being operated in said second resolution mode according to said second selection signal; [and positioning means for driving said lend to a first image-capturing position responding to said first selection signal to focus said optical image on said first number of cells of said photo-sensing device during said first resolution mode, said positioning means driving said lend to a second image-capturing position responding to said second selection signal to focus said optical image on said second number of cells of said photo-sensing device during said second resolution mode;]

pre-processing means for adjusting dc voltage of said electrical signal from said shift register as well as converting said electrical signal from analog format to digital format; and post processing means for adjusting contrast of said electrical signal of digital format.

6. [Apparatus as] *The apparatus of* claim 5, wherein said selection means [is] *comprises* a software interface.

7. [Apparatus as] *The apparatus of* claim 5, wherein said positioning means [is] *comprises* a driving motor.

8. [Apparatus as] *The apparatus of* claim 4, wherein said reset gate is included in a charge coupled device (CCD).

9. [Apparatus] *An apparatus* for converting an optical image through a lens to an electrical signal, said apparatus comprising:

*a* photo-sensing [means] *device* for exposing to light of said optical image to convert said optical image to a plurality *of* groups of charge responding to an exposing timing signal from [a] *an* exposing timing signal source;

a shift register for parallel receiving said plurality *of* groups of charge and serially transmitting said plurality *of* groups of charge responding to a shift control signal from a shift control signal source, said serially transmitted plurality *of* groups of charges forming said electrical signal;

control means for respectively generating a first reset signal and a second reset signal during a first resolution mode and a second resolution mode of said apparatus, a first number of cells of said photo-sensing [means] *device* being exposed to light of said optical image during said first resolution mode, a second number of cells of said photo-sensing [means] *device* being exposed to light of said optical image during said second resolution mode, said first number of cells of said photo-sensing [means] *device* being greater than said second number of cells of said photo-sensing [means] *device*, *a* period of said first reset signal being proportional to said first number of cells of said photo-sensing [means] *device*, *a* period of said second reset signal being proportional to said second number of cells of said photo-sensing [means] *device*, *the* period of said first reset signal being greater than *the period of* said second reset signal;

reset means for leading charges in said shift register to ground responding to said first reset signal and said second reset signal, said reset means coupled to said shift register being used to [generating] *generate a* potential-energy well at *an* end of each period of said first reset signal and said second reset signal, said potential-energy well eliminating residual charges left in said shift register, said photo-sensing [means] *device* converting said optical image to said plurality *of* groups of charge responding to said exposing timing signal, *the* period of said exposing timing signal being no less than *the* period of said first reset signal when said image processing system being in said first resolution mode, *the* period of said exposing timing signal being no less than *the* period of said second reset signal when said image processing system being in said second resolution mode;

selection means for determining said apparatus operating in said first resolution mode or in said second resolution mode according to *a* user's selection, *wherein* the user [click on] *chooses* a first position of *a* surface of said selection means to generate a first selection signal, *and wherein* the user [click on] *chooses* a second position of *the* surface of said selection means to generate a second selection signal, said apparatus being operated in said [second] *first* resolution mode according to said [second] *first* selection signal, said apparatus being operated in said second resolution mode according to said second selection signal;

positioning means for driving said [lend] *lens* to a first image-capturing position responding to said first selection signal to focus said optical image on said first number of cells of said photo-sensing device during said first resolution mode, said positioning means driving said lens to a second image-capturing position responding to said second selection signal to focus said optical image on said second number of cells of said photo-sensing device during said second resolution mode.

10. [Apparatus as] *The apparatus of* claim 9, further comprising:

pre-processing means for adjusting dc voltage of said electrical signal from said shift register as well as converting said electrical signal from analog format to digital format; and post processing means for adjusting contrast of said electrical signal [of] *having the* digital format.

11. [Apparatus as] *The apparatus of* claim 9, wherein said selection means [is] *comprises* a software interface.

12. [Apparatus as] *The apparatus of* claim 9, wherein said positioning means [is] *comprises* a driving motor.

13. [Apparatus as] *The apparatus of* claim 9, [wherein said] *further comprising a* reset gate [is] included in a charge coupled device (CCD).

*14. An apparatus, comprising:*

*control means for generating a first reset signal during a first resolution mode and a second reset signal during a second resolution mode, a first number of cells being exposed during said first resolution mode, a second number of cells being exposed during said second resolution mode, said first number of cells being greater than said second number of cells, a period of said first reset signal being proportional to said first number of cells, and a period of said second reset signal being proportional to said second number of cells;*

*reset means for leading charges in a shift register to ground responding to said first reset signal and said second reset signal to eliminate residual charges left in said shift register, and a period of an exposing timing signal being no less than one or more of said period of said first reset signal when in said first resolution mode and/or said period of said second reset signal when in said second resolution mode; and*

*positioning means for driving a lens between a first image-capturing position in said first resolution mode and a second image-capturing position in said second resolution mode.*

*15. The apparatus of claim 14, further comprising photo-sensing means for exposing said cells to an optical image.*

*16. The apparatus of claim 14, further comprising:*

*photo-sensing means for exposing said cells to an optical image; and*

*pre-processing means for receiving charges transmitted from said shift register to adjust dc voltage as well as convert from analog format to digital format.*

*17. An image processing system, comprising:*

*a light sensor to receive light processed by a light processing component;*

*a shift register coupled to the light sensor;*

*an exposing timing signal to generate exposure timing signals to control transmission of charges from the light sensor to the shift register, wherein the exposure timing signals include a first exposure timing signal corresponding to a high resolution mode and a second exposure timing signal corresponding to a low resolution mode; and*

*a positioning device to control a distance between the light processing component and the light sensor*

*according to the mode such that image light is directed onto a first portion of the light sensor during the high resolution mode and a second portion of the light sensor during the low resolution mode.*

*18. The image processing system of claim 17, wherein a period of the first exposure timing signal is no less than a period of the first reset signal used to control a transfer of charges from the shift register to ground in the high resolution mode, and wherein a period of the second exposing timing signal is no less than a period of the second reset signal used to control a transfer of charges from the shift register to ground in the low resolution mode.*

*19. The image processing system of claim 17, wherein a period of a first reset signal used to control a transfer of charges from the shift register to ground is proportional to a number of cells of the first light sensor portion illuminated during the high resolution mode, and wherein a period of the second exposing timing signal is proportional to a number of cells of the first light sensor portion illuminated during the low resolution mode.*

*20. A method, comprising:*

*transmitting timing signals to control transfer of charges from a light sensor to a shift register, wherein the timing signals comprise a first exposure timing signal corresponding to a high resolution mode and a second exposing timing signal corresponding to a low resolution mode;*

*transmitting a control signal to control transfer of charges from the shift register to a processing device; and*

*changing a distance between a lens and the light sensor to focus image light on a first portion of the light sensor during the first resolution mode, and to focus image light on a second portion of the light sensor during the second resolution mode.*

*21. The method of claim 20, wherein a period of the first exposure timing signal is no less than a period of a first reset signal used to control a transfer of charges from the shift register to ground in the high resolution mode, and wherein a period of the second exposing timing signal is no less than a period of a second reset signal used to control a transfer of charges from the shift register to ground in the low resolution mode.*

*22. The method of claim 20, wherein a period of a first reset signal used to control a transfer of charges from the shift register to ground is proportional to a number of cells of the first light sensor portion illunimated during the high resolution mode, and wherein a period of the second exposing timing signal is proportional to a number of cells of the first light sensor portion illuminated during the low resolution mode.*

*23. The method of claim 20, further comprising adjusting the photo-sensing device via a positioning device.*

*24. An apparatus, comprising:*

*means for transmitting timing signals to control transfer of charges from a light sensor to a shift register, wherein the timing signals comprise a first exposure timing signal corresponding to a high resolution mode and a second exposure timing signal corresponding to a low resolution mode;*

*means for transmitting a control signal to control transfer of charges from the shift register to a processing device; and*

*means for changing a distance between a lens and the light sensor to focus image light on a first portion of the light sensor during the high resolution mode, and to focus image light on a second portion of the light sensor during the low resolution mode.*

*25. The apparatus of claim 24, wherein a period of the first exposure timing signal is no less than a period of a first reset signal used to control a transfer of charges from the shift register to ground in the high resolution mode, and wherein a period of the second exposing timing signal is no less than a period of a second reset signal used to control a transfer of charges from the shift register to ground in the low resolution mode.*

*26. The apparatus of claim 24, wherein a period of the first reset signal used to control a transfer of charges from the shift register to ground is proportional to a number of cells of the first light sensor portion illuminated during the high resolution mode, and wherein a period of the second exposing timing signal is proportional to a number of cells of the first light sensor portion illuminated during the low resolution mode.*

*27. An apparatus, comprising:*

*means for sensing light processed by a light processing component;*

*means for storing charges output by the light sensing means;*

*an exposing timing signal source to generate exposure timing signals to control transmission of charges from the light sensing means to the storage means, wherein the exposure timing signals include a first exposure timing signal corresponding to a high resolution mode and a second exposure timing signal corresponding to a low resolution mode; and*

*a positioning device to control a distance between the light processing component and the light sensor according to the mode such that image light is directed onto a first portion of the light sensor during the high resolution mode and a second portion of the light sensor during the low resolution mode.*

* * * * *

UNITED STATES PATENT AND TRADEMARK OFFICE

CERTIFICATE OF CORRECTION

PATENT NO. : RE 40,628 E
APPLICATION NO. : 11/490506
DATED : January 27, 2009
INVENTOR(S) : Chen et al.

It is certified that error appears in the above-identified patent and that said Letters Patent is hereby corrected as shown below:

At column 12, line 59, please replace "timing signal to" with --timing signal source to--.
At column 13, line 7, please replace "the first reset" with --a first reset--.
At column 13, line 46, please replace "portion illunimated during" with --portion illuminated during--.
At column 14, line 25, please replace "period of the" with --period of a--.

Signed and Sealed this

Twenty-fifth Day of August, 2009

David J. Kappos

David J. Kappos
*Director of the United States Patent and Trademark Office*